US008833869B2

(12) United States Patent
Matsuzaki et al.

(10) Patent No.: US 8,833,869 B2
(45) Date of Patent: Sep. 16, 2014

(54) VEHICLE BRAKE SYSTEM

(75) Inventors: Norikazu Matsuzaki, Minami-alps (JP); Toshiyuki Innami, Mito (JP); Kimio Nishino, Minami-alps (JP); Ayumu Miyajima, Hitachinaka (JP); Toshiyuki Ajima, Tokai (JP); Masayuki Kikawa, Kai (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 583 days.

(21) Appl. No.: 12/708,463

(22) Filed: Feb. 18, 2010

(65) Prior Publication Data

US 2010/0253137 A1    Oct. 7, 2010

(30) Foreign Application Priority Data

Apr. 1, 2009  (JP) .................... 2009-089288

(51) Int. Cl.
| | |
|---|---|
| B60T 8/60 | (2006.01) |
| B60T 17/22 | (2006.01) |
| B60T 13/58 | (2006.01) |
| B60T 8/48 | (2006.01) |
| B60T 8/32 | (2006.01) |
| B60T 13/74 | (2006.01) |

(52) U.S. Cl.
CPC ............ B60T 17/221 (2013.01); B60T 13/588 (2013.01); B60T 8/4872 (2013.01); B60T 8/3265 (2013.01); B60T 13/745 (2013.01)
USPC ..................................... 303/155

(58) Field of Classification Search
CPC ... B60T 13/588; B60T 17/221; B60T 8/3265; B60T 13/145; B60T 8/441; B60T 7/042
USPC ................. 303/114.1, 115.1, 115.2, 155, 303
See application file for complete search history.

(56) References Cited

U.S. PATENT DOCUMENTS

| | | | | |
|---|---|---|---|---|
| 6,183,050 | B1 * | 2/2001 | Ganzel | 303/114.1 |
| 6,439,674 | B1 * | 8/2002 | Niino | 303/152 |

(Continued)

FOREIGN PATENT DOCUMENTS

| | | |
|---|---|---|
| DE | 32 41 688 C2 | 5/1984 |
| DE | 103 27 553 A1 | 1/2005 |

(Continued)

OTHER PUBLICATIONS

German Office Action dated Nov. 21, 2011 including English-language translation (Twelve (9) pages).

(Continued)

*Primary Examiner* — Vishal Sahni
(74) *Attorney, Agent, or Firm* — Crowell & Moring LLP

(57) ABSTRACT

A brake system which can secure quietness in a passenger compartment is provided. A vehicle brake system 1 includes a brake assist device 2 which boosts a pressing force on a brake pedal 5 by drive of a motor 31, and an assist control unit 6 which controls the motor 31. The assist control unit 6 changes responsiveness of the motor 31 in accordance with a vehicle speed, and sets a dead zone amount and a filtering value to large values in a region with a low vehicle speed. Thereby, responsiveness of a boosting operation of the motor 31 to the operation of the brake pedal is made low, and a rotational variation and a vibration are prevented from occurring to the motor 31 by a minute variation of a detection signal of a stroke sensor 14 during low-speed traveling or stoppage of traveling.

6 Claims, 5 Drawing Sheets

(56) References Cited

U.S. PATENT DOCUMENTS

| | | |
|---|---|---|
| 2002/0026272 A1 | 2/2002 | Yamamoto |
| 2003/0218378 A1* | 11/2003 | Tanaka et al. ............ 303/146 |
| 2005/0046270 A1 | 3/2005 | Arakawa et al. |
| 2006/0163941 A1 | 7/2006 | Von Hayn et al. |
| 2008/0231109 A1 | 9/2008 | Yamada et al. |
| 2009/0256417 A1* | 10/2009 | Ishii et al. ............... 303/152 |
| 2010/0089054 A1 | 4/2010 | Leiber |
| 2010/0253137 A1* | 10/2010 | Matsuzaki et al. ....... 303/155 |

FOREIGN PATENT DOCUMENTS

| | | |
|---|---|---|
| DE | 10 2004 040 955 A1 | 4/2005 |
| DE | 10 2006 059 840 A1 | 6/2008 |
| JP | 2000-203402 A | 7/2000 |
| JP | 2002-67906 A | 3/2002 |
| JP | 2005-28975 A | 2/2005 |
| JP | 2008-162482 A | 7/2008 |
| JP | 2008-239142 A | 10/2008 |
| WO | WO 2004/005095 A1 | 1/2004 |

OTHER PUBLICATIONS

Japanese-language Office Action dated Sep. 11, 2012 (Three (3) sheets).

* cited by examiner

US 8,833,869 B2

VEHICLE BRAKE SYSTEM

BACKGROUND OF THE INVENTION

1. Field of the Invention

The present invention relates to a vehicle brake system for controlling the braking force of a vehicle.

2. Background Art

A brake system for a vehicle generally called an automobile uses a booster which uses negative pressure of an engine in order to assist a driver in the brake operation force. A brake system has been proposed recently, which performs a boosting operation by using an electric motor instead of negative pressure. This art is disclosed in, for example, JP Patent Publication (Kokai) No. 2008-162482. In JP Patent Publication (Kokai) No. 2008-162482, the brake system controls an electric motor 40 by detecting the state of an input piston 32 operated by a driver, and can assist the driver in the brake force by driving a boost piston 31. By including the aforementioned configuration, which is one example of the booster, a boosting operation of generating a large braking force with a small operation force is enabled.

The aforementioned vehicle brake system is demanded to have the characteristic of stopping the vehicle in a short distance in an emergency while the operation thereof is requested to be stable or quiet, and adaptation to the different requests for responsiveness and quietness of brake control is required.

SUMMARY OF THE INVENTION

An object of the present invention is to provide a vehicle brake system which can make responsiveness and quietness of brake control compatible.

One of desirable modes of the present invention is characterized by including an input piston that moves based on an operation of a brake pedal, an assist piston that moves by an electric motor, a master cylinder that generates a fluid pressure of a brake fluid based on both of the input piston and assist piston, and a control unit that controls the electric motor, and in that the control unit controls the electric motor based on the operation of the brake pedal, and changes responsiveness of the control of the electric motor with respect to the operation of the brake pedal based on a traveling state of a vehicle.

According to the present invention, a vehicle brake system which makes responsiveness and quietness of brake control compatible.

DESCRIPTION OF SYMBOLS

1 VEHICLE BRAKE SYSTEM
2 BRAKE ASSIST DEVICE
3 MASTER CYLINDER
4a-4d WHEEL CYLINDER
5 FLUID PRESSURE CONTROL UNIT
6 ASSIST CONTROL UNIT
7 CONTROL DEVICE
10 RESERVOIR TANK
11 INPUT ROD
13 ELECTRIC ACTUATOR
14 STROKE SENSOR
15 RETURN SPRING
16 MOVABLE MEMBER
21 ASSIST PISTON
22 SECONDARY PISTON
23 PRIMARY FLUID CHAMBER
24 SECONDARY FLUID CHAMBER
31 MOTOR
31a ROTOR
31b STATOR
32 ROTATION-LINEAR MOTION CONVERTING DEVICE
32a BALL SCREW NUT
32b BALL SCREW SHAFT
33 POSITION SENSOR
50a, 50b GATE OUT VALVE
51a, 51b GATE IN VALVE
52a-52d IN VALVE
53a-53d OUT VALVE
54a, 54b PUMP
55 MOTOR
56 MASTER PRESSURE SENSOR
100a FL WHEEL: FRONT LEFT WHEEL
100b FR WHEEL: FRONT RIGHT WHEEL
100c RL WHEEL: REAR LEFT WHEEL
100d RR WHEEL: REAR RIGHT WHEEL
101a-101d DISK ROTOR
103a, 103b MASTER PIPING
201 DEAD ZONE AMOUNT CALCULATING UNIT
202 DEAD ZONE PROCESSING UNIT
203 FILTERING CONSTANT SETTING UNIT
B BRAKE PEDAL

DETAILED DESCRIPTION OF THE PREFERRED EMBODIMENTS

Figure 1:
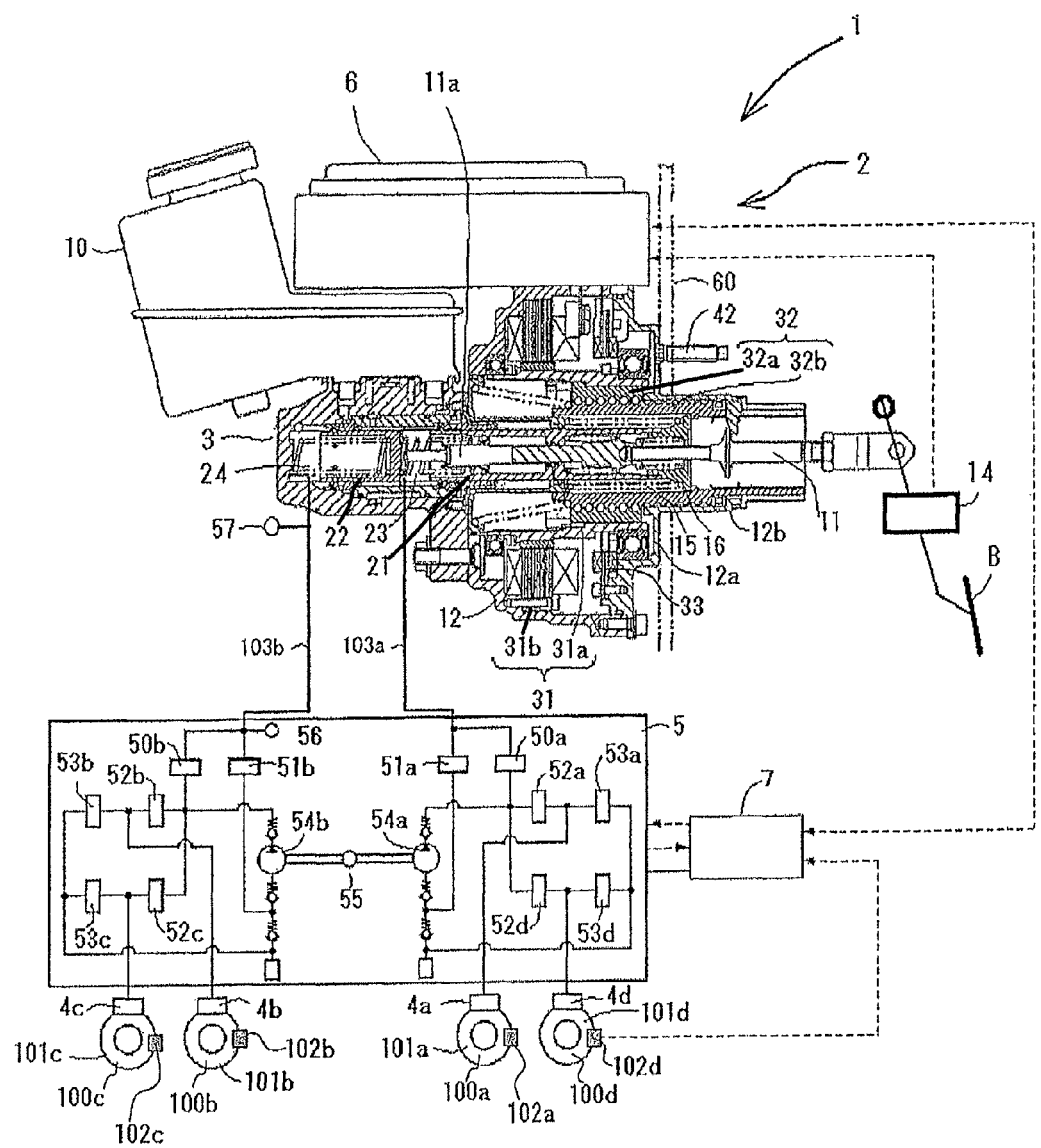
FIG. 1 is a system block diagram of an entire configuration of a vehicle brake system according to an embodiment.

Hereinafter, a vehicle brake system according to an embodiment of the present invention will be described with reference to FIGS. 1 to 8. FIG. 1 is a system block diagram showing a configuration of a vehicle brake system according to the embodiment of the present invention.

In a vehicle brake system 1, based on an operation amount of a brake pedal B, and a state of traveling or the like of a vehicle, a brake assist device 2 controls a fluid pressure of a brake fluid generated by a master cylinder 3 based on the direction in which the operation force of the brake pedal B increases or the direction in which the operation force decreases, and supplies the brake fluid at the aforementioned controlled fluid pressure to a fluid pressure control unit 5.

In this embodiment, the fluid pressure of the brake fluid generated by the master cylinder 3 is transmitted to the fluid pressure control unit 5, the fluid pressure of the brake fluid is further transmitted to wheel cylinders 4a to 4d of respective wheels from the fluid pressure control unit 5, braking forces occur to the rotations of disk rotors 101a to 101d of the respective wheels by the wheel cylinders 4a to 4d of the respective wheels, and a braking force occurs to the vehicle.

The brake assist device 2 has a casing 12 for fixing the brake assist device 2 to a bulkhead 60 that is a vehicle body member providing partition between an engine room and a passenger compartment of a vehicle body, and components of the brake assist device 2 are held in the aforementioned casing 12. The aforementioned components will be described later.

The aforementioned casing 12 has a fixed wall 12a and a barrel section 12b, and the aforementioned fixed wall 12a is provided with a plurality of, three fixing screws 42 in this embodiment on the circumference with the center axis of the aforementioned barrel section 12b as the center equidistantly, at intervals of 120 degrees in this embodiment.

Though in FIG. 1, the aforementioned bulkhead 60 which provides partition between the engine room and the passenger compartment is shown by being simplified, the casing 12 is fixed to the aforementioned bulkhead by the aforementioned bulkhead 60 being brought into close contact with the right side surface in the drawing of the aforementioned fixed wall 12a, and being fastened with the aforementioned fixing screw 42, the part located at the left side from the aforementioned fixed wall 12a in the brake assist device 2 exists on the engine room side of the aforementioned bulkhead, and the aforementioned barrel section 12b which is the part located at the right side from the aforementioned fixed wall 12a of the brake assist device 2 protrudes into the passenger compartment from a hole formed in the aforementioned bulkhead.

The master cylinder 3 is fixed to the aforementioned casing 12, a reservoir tank 10 for storing a brake fluid is further held on the aforementioned master cylinder 3. The aforementioned reservoir tank 10 is disposed in a space between the aforementioned master cylinder 3 and an assist control unit 6 which will be described later, and therefore, the effect of making the entire device of the brake assist device 2 compact is provided.

The aforementioned master cylinder 3 is a tandem type in this embodiment, and a primary fluid chamber 23 and a secondary fluid chamber 24 are provided therein. The fluid pressures of the brake fluids at substantially the same pressures are outputted from the primary fluid chamber 23 and the secondary fluid chamber 24 of the aforementioned master cylinder 3, that is, the brake fluid pressures at the same pressure are outputted from the aforementioned primary fluid chamber 23 and the secondary fluid chamber 24, whereby the fluid pressures of the brake fluids of two systems can be used, and safety and reliability are enhanced. These fluid pressures of the two systems are respectively transmitted to the fluid pressure control unit 5.

Inside the casing 12 of the aforementioned brake assist device 2, an input rod 11, an input piston 11a provided at a tip end side of the aforementioned input rod 11, an assist piston 21, a motor (electric motor) 31 which acts as an electric actuator, and a rotation-linear motion converting mechanism 32 which converts a rotational motion of the aforementioned motor 31 into a linear motion are provided.

The aforementioned input rod 11 is mechanically connected to the brake pedal B provided in the passenger compartment, and based on the operation of the brake pedal B, the input rod 11 moves to the left side or the right side of FIG. 1. When a driver depresses the brake pedal B, the input rod 11 moves in the leftward direction from the right of FIG. 1, that is, moves to the direction to the engine room side from the passenger compartment side, and the input piston 11a provided at the side of the master cylinder, of the input rod 11 pressurizes the brake fluid of the primary fluid chamber 23 of the master cylinder 3.

The aforementioned secondary piston 22 acts to make the fluid pressures of the primary fluid chamber 23 and the secondary fluid chamber 24 the same pressure, and therefore, when the primary fluid chamber 23 is pressurized by the input piston 11a, the fluid pressure of the secondary fluid chamber 24 is similarly pressurized.

The operation amount of the brake pedal B is detected by a stroke sensor 14. The detected value is inputted in the assist control unit 6, and an AC power is supplied to a stator 31b of the motor 31 from the assist control unit 6 so that the braking force based on the aforementioned operation amount occurs. Based on the aforementioned AC power, rotational torque occurs to a rotor 31a of the motor 31 which is the electric actuator. The aforementioned rotational torque is transmitted to the rotation-linear motion converting mechanism 32 which converts a rotational motion to a linear motion. The rotational moving amount of the rotor 31a of the aforementioned motor 31 is converted into a linear moving amount, and the assist piston 21 is moved in the leftward direction of the drawing. Both pistons that are the assist piston 21 and the input piston 11a act on the primary fluid chamber 23 of the master cylinder 3 as the primary pistons, and based on the moving amount of the aforementioned assist piston, the brake fluid is pressurized.

The secondary piston 22 of the secondary fluid chamber 24 of the master cylinder 3 is basically a free piston which can freely move if the friction and action of the spring for improvement of the characteristic are ignored. The aforementioned secondary piston 22 moves to the left side of FIG. 1 based on increase in the fluid pressure of the primary fluid chamber 23. Since the secondary piston 22 moves so that the fluid pressures of the primary fluid chamber 23 and the secondary fluid chamber 24 become substantially equal to each other, both the fluid pressure of the primary fluid chamber 23 and the fluid pressure of the secondary fluid chamber 24 are pressurized based on the movement of the input piston 11a and the assist piston 21 which act as the primary pistons, and the brake fluid pressures at substantially the same pressures are outputted to a master piping 103a and a master piping 103b from the primary fluid chamber 23 and the secondary fluid chamber 24.

As the operation amount of the aforementioned brake pedal B, the depressing pressure on the brake pedal B may be detected, or the depressed amount of the brake pedal B may be detected. A target braking force is calculated in the assist control unit 6 with the aforementioned operation amount of the brake pedal B as a parameter, and the motor 31 which is the electric actuator is controlled.

In the present embodiment, the depressing amount is detected by the stroke sensor 14 as the operation amount of the brake pedal B, and the target braking force is calculated with the detected depressed amount as the control parameter. The reason of use of the depressed amount of the brake pedal B as the control parameter is that the depressed amount of the brake pedal B is obtained by detecting the moving amount of the input rod 11, and therefore, the depressed amount can be relatively easily detected with high precision as compared with the case where the depressing pressure on the brake pedal B is detected.

As the motor 31, a DC motor, a DC brushless motor, an AC motor and the like can be used. Among these motors, a DC motor or a DC brushless motor is desirable since the on-board power supply is a DC power supply. Further, the DC motor requires a commutator (brush), and in view of durability and reliability, and in view of controllability and quietness, a DC brushless motor is the most desirable.

There are several kinds of DC brushless motors, and in the present embodiment, from the viewpoint of being capable of obtaining a larger output power with more compact size, the DC brushless motor forms the structure (hereinafter, described as a permanent magnet motor) in which the stator is provided with a stator winding including a three-phase winding, the rotor is provided with a permanent magnet, and the magnet pole is formed by the aforementioned permanent magnet. For the permanent magnet, a neodymium magnet is the most desirable, but a ferrite magnet can be used.

The aforementioned assist control unit 6 obtains the target braking force based on the control parameter, and performs position control of the assist piston 21 so as to generate the fluid pressure of the brake fluid corresponding to the target braking force in the master cylinder. Though the concrete control content will be described later, when the brake pedal B is depressed, the depressed amount is measured by the stroke sensor 14 or the like, and based on the difference of the relative positions of, for example, the input piston 11a and the assist piston 21, the motor 31 is driven so that the difference of the aforementioned relative positions decreases.

In order to perform position control of the assist piston 21 as described above by the motor 31, the assist control unit 6 obtains the target rotational speed and the target rotational amount of the motor 31, and supplies a three-phase AC power from the inverter circuit incorporated in the assist control unit 6 so that the rotational speed of the motor 31 becomes the target rotational speed.

The assist piston 21 moves to the direction of the master cylinder based on the rotational movement of the motor 31, and the fluid pressure of the brake fluid of the master cylinder increases. The fluid pressure of the brake fluid becomes the braking forces which the aforementioned wheel cylinders 4a to 4d generate, and therefore, the braking force increases based on the movement of the assist piston 21.

As will be described later, the moving amount of the assist piston 21 is controlled based on the target rotational amount or the target rotational angle of the motor 31, and the assist control unit 6 controls the rotational amount, that is, the rotational angle of the motor 31 based on the signal from a position sensor 33 such as a resolver which detects the position of the rotor 31a so that the actual moving amount becomes the target moving amount or the target rotational angle.

The aforementioned assist control unit 6 uses the operation amount of the brake pedal B and the traveling state as the control parameters in the case of the present embodiment.

As described above, for control of the rotational amount of the motor 31, the magnetic pole position of the rotor 31a is detected and a signal showing the magnetic pole position is outputted from the position sensor 33 for detecting the magnetic pole position of the rotor 31a of the motor 31.

The aforementioned assist control unit 6 receives the above described signal, calculates the rotational angle, that is, the rotational amount of the rotor 31a of the motor 31 based on the signal, and based on the rotational angle, it calculates the advancing amount of the rotation-linear motion converting mechanism 32, that is, the actual displacement amount of the assist piston 21. The assist control unit 6 controls the motor 31 so that the actual displacement amount of the assist piston 21 becomes close to the target displacement amount that is the aforementioned target moving amount of the assist piston 21.

As the rotation-linear motion converting mechanism 32 which converts a rotational motion into a linear motion, or converts a linear motion into a rotational motion, for example, a rack and pinion, a ball feeding screw and the like can be used. From the relationship with the moving distance of the assist piston 21, a ball feeding screw method is more preferable, and therefore, the method by a ball feeding screw is used in the present embodiment.

In this embodiment, the rotor 31a of the motor 31 forms a hollow shape, and the input piston 11a and the assist piston 21 penetrate through the hollow portion inside the rotor 31a. The inner peripheral surface of the rotor 31a fits to the outer peripheral surface on the outer side of a ball screw nut 32a.

The rotor 31a of the motor 31 is rotatable, but is held by a bearing so as not to move in the axial direction of the input piston 11a and the assist piston 21, and the ball screw nut 32a is also rotatable, but cannot move in the aforementioned axial direction.

When the ball screw nut 32a rotates to the one side by rotation of the rotor 31a, a ball screw shaft 32b moves in the axial direction toward the master cylinder 3, and a projection provided at the ball screw shaft 32b presses the assist piston 21 toward the master cylinder 3.

By the thrust force, the assist piston 21 is pressed to the direction of the master cylinder 3, and increases the fluid pressure of the primary fluid chamber 23 of the master cylinder 3. The fluid pressure of the secondary fluid chamber 24 changes so as to be substantially the same as that of the primary fluid chamber 23, and therefore, in this case, the fluid pressure outputted from the secondary fluid chamber 24 also increases.

The assist piston 21 is pressed against the aforementioned projection of the ball screw shaft 32b by the spring. When the ball screw nut 32a rotates to the other side, the ball screw shaft 32b moves to the right side in FIG. 1, that is, in the direction opposite from the master cylinder 3, and the aforementioned projection moves to the right side of FIG. 1. Therefore, the assist piston 21 moves in the direction opposite from the master cylinder 3 which is the right direction of FIG. 1 by the force of the spring. In this case, the output fluid pressures of the primary fluid chamber 23 and the secondary fluid chamber 24 of the master cylinder 3 both decrease.

A movable member 16 is configured so that one end of a return spring 15 is engaged with one side thereof and the force in the direction opposite from the thrust force of the ball screw shaft 32b acts on the ball screw shaft 32b. Thereby, when return control of the ball screw shaft 32b is disabled due to a failure or the like of the motor 31 during braking, that is, in the state where the assist piston 21 is pressed and the respective fluid chambers 23 and 24 are pressurized, the ball screw shaft 32b can be returned to the initial position by the reaction force of the return spring 15. Accordingly, the fluid pressure (master cylinder pressure) of each of the fluid chambers 23 and 24 can be reduced to a value around substantially zero, and destabilization of the vehicle behavior due to drag of the brake, for example, can be avoided.

The increased fluid pressures of the primary fluid chamber 23 and the secondary fluid chamber 24 are transmitted to the wheel cylinders 4a to 4d via the master pipings 103a and 103b. The wheel cylinders 4a to 4d are each configured by a cylinder, a piston, a pad and the like not illustrated. Each of the pistons is advanced by the operating fluid supplied from the primary fluid chamber 23 and the secondary fluid chamber 24, and the piston presses the pad to the disk rotors 101a to 101d to obtain a braking force.

Next, the principle of amplifying the thrust force of the input rod 11 by driving the motor 31 by the assist control unit 6 will be described. In the embodiment, as described above, the input rod 11 by the depression on the brake pedal B displaces to the master cylinder 3 side with respect to the assist piston 21. In accordance with the displacement amount, the motor 31 is driven in the direction in which the aforementioned displacement amount, that is, the difference of the relative positions of the input rod 11 and the assist piston 21 becomes small, the assist piston 21 moves to the master cylinder 3 side and the primary fluid chamber 23 is pressurized.

The amplification ratio (hereinafter, called "boosting ratio") of the output fluid pressure of the master cylinder 3 is determined by the ratio of the displacement amounts of the input rod 11 and the assist piston 21, the ratio of the sectional areas of the input rod 11 and the assist piston 21 and the like.

Especially when the assist piston 21 is displaced by the same amount as the displacement amount of the input rod 11, it is generally known that the boosting ratio (N/N) is uniquely set by the following expression (1) from a sectional area AIR of the input rod 11 and a sectional area APP of the assist piston 21.

$$N/N=(AIR+APP)/AIR \qquad (1)$$

More specifically, when based on the required boosting ratio, the sectional area AIR of the input rod 11 and the sectional area APP of the assist piston 21 are set, and the displacement amount of the assist piston 21 is controlled to be equal to the displacement amount of the input rod 11, a constant boosting ratio can be always obtained.

As described above, the displacement amount of the input rod 11 is detected by the stroke sensor 14, and the displacement amount of the assist piston 21 is calculated by the assist control unit 6 based on the signal from the position sensor 33 equipped at the motor 31.

Next, variable boosting control processing of the assist control unit 6 will be described. The variable boosting control processing means control processing for giving the displacement of the amount obtained by multiplying the displacement amount of the input rod 11 by a proportional gain $K_1$ to the assist piston 21. The proportional gain $K_1$ is desirably one ($K_1=1$) in controllability, but when the braking force exceeding the brake operation amount of a driver is required in an emergency brake or the like, it can be temporarily changed to a value exceeding one. Thereby, even with the same brake operation amount, larger brake force can be generated by increasing the master pressure as compared with the ordinary time (the case of $K_1=1$). Here, determination of emergency brake can be made by determining whether or not the time change rate of the brake operation amount detection signal from the stroke sensor 14 exceeds a predetermined value, for example.

According to the aforementioned variable boosting control processing, the master pressure is increased and decreased in accordance with the displacement amount of the input rod 11 following the brake request of the driver, and therefore, the brake force corresponding to the request of the driver can be generated.

By changing the proportional gain $K_1$ to the value of less than one ($K_1<1$), the variable boosting control processing can be applied to the regenerative coordination brake control which depresses the fluid pressure of a brake fluid by the amount of the regenerative brake force in a hybrid vehicle.

Next, the processing at the time of carrying out the automatic brake function will be described. The automatic brake control processing is the control processing of advancing or retreating the assist piston 21 so as to regulate the operating pressure of the master cylinder 3 to the required fluid pressure of automatic brake (hereinafter, called "automatic brake required fluid pressure").

As the control method of the assist piston 21, the assist control unit 6 stores the data table showing the relationship of the displacement amount of the assist piston 21 and the output fluid pressure of the master cylinder 3 (described as a master pressure for short), which is previously acquired, and calculates the output fluid pressure of the master cylinder 3 required as automatic brake, based on the data table, and obtains the displacement amount of the assist piston 21 required for realizing the calculated output fluid pressure from the aforementioned stored data table. With the obtained displacement amount as the target value, the motor 31 is driven by the assist control unit 6, and the motor 31 is controlled so that the displacement amount of the assist piston 21 becomes the aforementioned target displacement amount.

Alternatively, as another control method, a method can be used, in which a fluid pressure sensor (hereinafter, described as a master pressure sensor) 57 for detecting the output fluid pressure of the master cylinder 3 is provided at the output side of the master cylinder 3, and when the aforementioned required output fluid pressure of the master cylinder 3 is calculated, the aforementioned motor 31 is controlled with the assist control unit 6 so that the output fluid pressure of the aforementioned master cylinder 3 becomes the calculated fluid pressure, and feedback is performed by using the master pressure detected by the master pressure sensor 57.

The automatic brake required fluid pressure can be received from an external unit, and the automatic brake function can be used in connection with brake control in, for example, vehicle follow-up control, lane departure avoidance control, obstacle avoidance control or the like.

A control device 7 calculates a target brake force generated at each wheel based on the distance from a car ahead, road information, a vehicle state amount, for example, a yaw rate, a longitudinal acceleration, a lateral acceleration, a steering angle, wheel speeds, vehicle body speed, and the like which are inputted, and based on the result, the control device 7 performs control of the fluid pressure control unit 5.

The fluid pressure control unit 5 controls the fluid pressure of a brake fluid to be supplied to each of the wheel cylinders 4a to 4d in accordance with the control command of the control device 7 for controlling the fluid pressure control unit 5. The fluid pressure control unit 5 includes gate OUT valves 50a and 50b for controlling supply of the operating fluid pressurized in the master cylinder 3 to each of the wheel cylinders 4a to 4d, gate IN valves 51a and 51b for controlling supply of the same to pumps 54a and 54b, IN valves 52a to 52d for controlling supply of the operating fluid to each of the wheel cylinders 4a to 4d from the master cylinder 3 or the pumps 54a and 54b, OUT valves 53a to 53d for performing depression control of the fluid pressure to the wheel cylinders 4a to 4d, the pumps 54a and 54b for increasing the master pressure generated in the master cylinder 3, a motor 55 for pump drive which drives the pumps 54a and 54b, and a master pressure sensor 56 which detects the master pressure.

The master pressure sensor 57 detects the master pressure which the assist control unit 6 uses for control, and the master pressure sensor 56 detects the master pressure which the control device 7 uses for control. The fluid pressure sensor receives supply of the power supply voltage from the control circuit which it uses, supplies the output voltage based on the fluid pressure to the supplied power supply voltage, and the aforementioned control circuit detects the fluid pressure from the power supply voltage which the control circuit supplies and the aforementioned output voltage. Accordingly, even if the detection target is the same, the fluid pressure sensor is desirably provided at each control circuit to be used, from the viewpoint of enhancement in detection precision.

The aforementioned fluid pressure control unit 5 performs antilock brake control (ABS), and vehicle behavior stabilization control (VSA). Further, the fluid pressure control unit 5 is configured by two systems that are a first brake system which receives supply of the operating fluid from the primary fluid chamber 23, and controls the brake forces of an FL wheel 100*a* and an RR wheel 100*d*, and a second brake system which receives supply of the operating fluid from the secondary fluid chamber 24, and controls the brake forces of an FR wheel 100*b* and an RL wheel 100*c*.

By adopting such a configuration, even when one of the brake systems fails, the brake forces of the two wheels located on the diagonal line of the vehicle are secured by the other normal brake system, and therefore, the behavior of the vehicle can be kept stable.

In FIG. 1, the gate OUT valves 50*a* and 50*b* are equipped between the master cylinder 3 and the IN valves 52*a* to 52*d*, and are opened when the operating fluid pressurized in the master cylinder 3 is supplied to the wheel cylinders 4*a* to 4*d*. The gate IN valves 51*a* and 51*b* are included between the master cylinder 3 and the pumps 54*a* and 54*b*, and are opened when the operating fluid pressurized in the master cylinder 3 is raised in pressure by the pumps 54*a* and 54*b*, and is supplied to the wheel cylinders 4*a* to 4*d*.

The IN valves 52*a* to 52*d* are equipped at the upstream from the wheel cylinders 4*a* to 4*d*, and are opened when the operating fluid pressurized in the master cylinder 3 or the pumps 54*a* and 54*b* is supplied to the wheel cylinders 4*a* to 4*d*.

The OUT valves 53*a* to 53*d* are equipped at the downstream from the wheel cylinders 4*a* to 4*d*, and are opened when the wheel pressure is decreased. Each of the gate OUT valves 50*a* and 50*b*, the gate IN valves 51*a* and 51*b*, the IN valves 52*a* to 52*d* and the OUT valves 53*a* to 53*d* is of an electromagnetic type. Energization to a solenoid not illustrated is individually controlled for each valve, and the opening and closing amount of each of the valves is individually regulated.

Further, the gate OUT valves 50*a* and 50*b*, the gate IN valves 51*a* and 51*b*, the IN valves 52*a* to 52*d* and the OUT valves 53*a* to 53*d* may be either normally open valves or normally closed valves. However, in the first embodiment, the gate OUT valves 50*a* and 50*b* and the IN valves 52*a* to 52*d* are normally open valves, and the gate IN valves 51*a* and 51*b* and the OUT valves 53*a* to 53*d* are normally closed valves.

By adopting such a configuration, even when power supply to the respective valves is stopped, the gate IN valves and OUT valves are closed, and the gate OUT valves 50*a* and 50*b* and the IN valves 52*a* to 52*d* open, and the operating fluid pressurized in the master cylinder 3 reaches all the wheel cylinders 4*a* to 4*d* to generate the brake force as required by the driver.

The pumps 54*a* and 54*b* further increase the master pressure and supplies the master pressure to the wheel cylinders 4*a* to 4*d* when the pressure exceeding the operating pressure of the master cylinder 3 is needed for performing, for example, vehicle behavior stabilization control, automatic brake and the like. As the pumps 54*a* and 54*b*, a plunger pump, a trochoid pump, a gear pump and the like are suitable, but in the respect of quietness, a gear pump is desirable.

The motor 55 is operated by the power supplied based on the control command of the fluid pressure control unit 5, and drives the pumps 54*a* and 54*b* connected to the motor 55 itself. As the motor 55, a DC motor, a DC brushless motor, an AC motor and the like are suitable, but in the respect of controllability, quietness and durability, a DC brushless motor is desirable.

The master pressure sensor 56 is a pressure sensor which is equipped at a downstream of the master piping 103*b* at the secondary side, and detects the master pressure. The number of master pressure sensors 56 and the position for installation thereof are not limited to the example shown in FIG. 1, and can be determined with consideration given to controllability, failsafe and the like.

The assist control unit 6 can calculate the rotational angle of the motor 31 based on the signal of the position sensor 33, and therefore, the advancing amount of the rotation-linear motion converting mechanism 32, that is, the displacement amount of the assist piston 21 based on the rotational angle of the motor 31, and can calculate the displacement amount of the input rod 11 from the value of the pedal stroke. Accordingly, from the stroke sensor 14 which detects the brake operation amount, the master pressure can be estimated.

Accordingly, by comparing the estimated master pressure and the master fluid pressure detected by the master pressure sensor 57, the operation failure can be detected, such as the case where the assist piston 21 cannot be operated by the motor 31 due to the failure of the motor 31 itself, breakage of the power supply line and the like.

By comparing the current value directly supplied to the motor 31 and the motor displacement amount, failure of the motor 31 also can be detected. In this manner, the assist control unit 6 can detect the failed state of the motor 31 from the current value and the voltage value supplied to the motor 31, the output value of the stroke sensor 14 and the output value of the master pressure sensor 57. Further, the control device 7 for controlling the fluid pressure control unit 5 also can detect the failed state of the fluid pressure control unit 5.

The wheel speed sensors 102*a* to 102*d* are the sensors which are equipped at the respective wheels 100*a* to 100*d*, and detect the respective wheel speeds. The wheel speed signals detected by the wheel speed sensors 102*a* to 102*d* are inputted in the control device 7 for controlling the fluid pressure control unit 5, and are transmitted to the assist control unit 6 by an in-vehicle communication network (CAN: Controlled Area Network).

Figure 2:
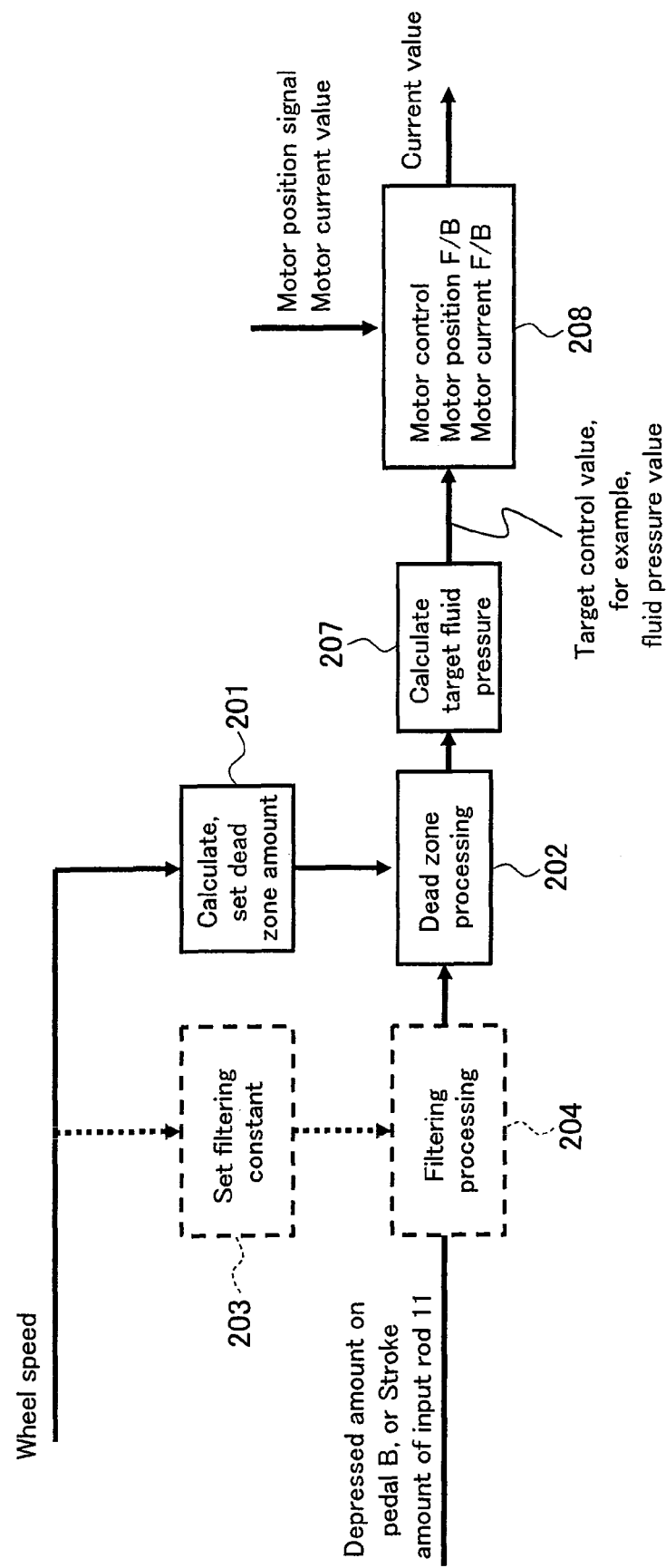
FIG. 2 is a schematic block diagram of control of the vehicle brake system of a C/U for a booster.
Figure 3:
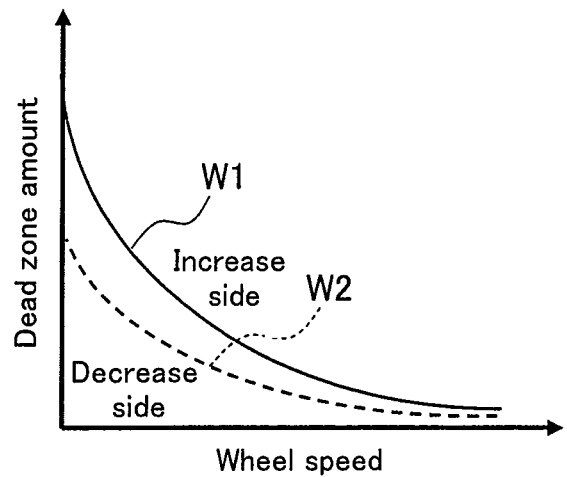
FIG. 3 is a graph showing the relationship of a wheel speed and a dead zone amount.
Figure 4:
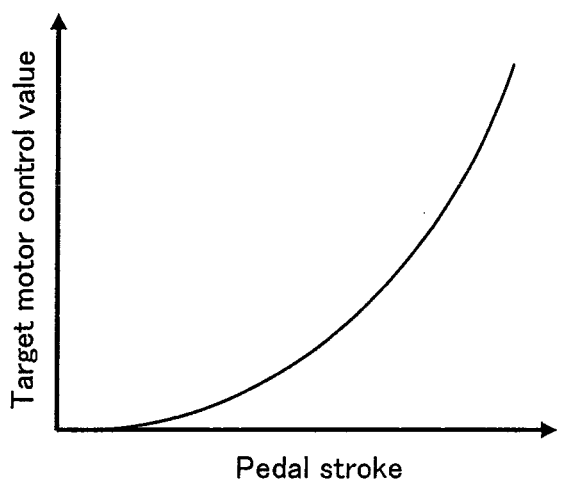
FIG. 4 is a graph showing the relationship of a pedal stroke amount and a target control amount.
Figure 5:
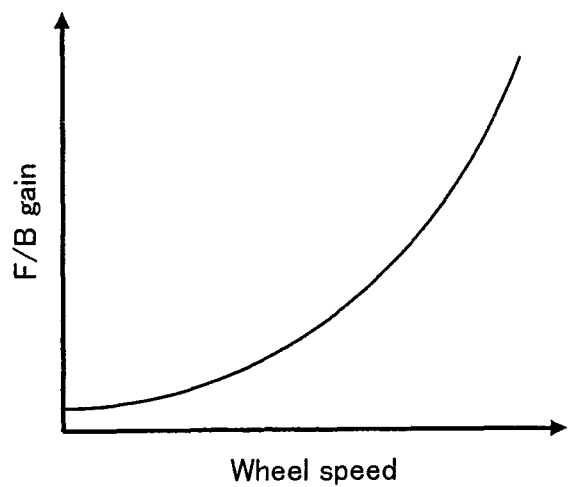
FIG. 5 is a graph showing the relationship of the wheel speed and an F/B gain.

Next, by using FIGS. 2 to 5, the control content of the vehicle brake system 1 according to the present embodiment will be described. FIG. 2 is a block diagram explaining the function realized by execution of the program in the assist control unit 6. FIG. 3 is a graph showing the relationship between the wheel speed and the dead zone amount. FIG. 4 is a graph showing the relationship between the pedal stroke amount and the target control value. FIG. 5 is a graph showing the relationship between the wheel speed and the feedback gain of the motor.

A dead zone amount calculating unit 201 and a dead zone processing unit 202 are processing units relating to solution of the above described problem to be solved, and a filtering constant setting unit 203 and a filtering processing unit 204 are another embodiment with respect to the aforementioned dead zone amount calculating unit 201 and the dead zone processing unit 202.

The dead zone processing unit 202 performs dead zone processing for the input value detected by the stroke sensor 14. The dead zone processing unit 202 compares the dead zone amount calculated and set by the dead zone amount calculating unit 201 with the input value, and when the input value changes beyond the dead zone amount, the dead zone processing unit 202 performs processing of responding to the input.

The dead zone amount calculating unit 201 calculates the dead zone amount of the stroke sensor 14 based on the wheel speed signals of the respective wheels 100*a* to 100*d*. The wheel speed signal is inputted in the control device 7 for controlling the fluid pressure control unit 5, and is inputted in the assist control unit 6 from the control device 7 for controlling the fluid pressure control unit 5.

As for setting of the dead zone amount or setting of the filtering constant, responsiveness may be low as compared with the current value control of the motor 31 based on the stroke sensor 14, and if information is received from the control device 7 based on the information transfer of CAN or the like which is a communication system in the vehicle and response is made, responsiveness does not pose any problem, and is sufficiently adaptable.

The dead zone amount or the filtering constant is set so as to prevent occurrence of vibrations to the apparatuses for brake control and the mounting portions or suppress the vibrations to be small as a result of the rotational variation of the motor 31 occurs or increases by a minute variation of the detection signal of the stroke sensor 14 when the vehicle speed is a predetermined speed or lower.

For example, as shown in FIG. 3, by setting the dead zone amount at a small value or setting the filtering constant at a large value in the region with a high vehicle speed, responsiveness of the boosting operation by the motor 31 can be made high with respect to the operation of the brake pedal B. FIG. 3 does not show the filtering constant, but as the vehicle speed is lower, the filtering constant is set to be smaller, and as the vehicle speed becomes higher, the filtering constant is set to be higher. By setting the dead zone amount at a large value in the region at a low vehicle speed, a minute change of the operation of the brake pedal B is ignored in the dead zone processing unit 202, and responsiveness of the boosting operation by the motor 31 to the operation of the brake pedal B can be made low.

Thereby, for example, when a minute variation occurs to the detection signal of the stroke sensor 14 in the region with a low vehicle speed, the motor 31 can be restrained from generating a rotational variation in response to the minute variation, or the motor 31 and the machine mechanism can be restrained from vibrating. More specifically, the above setting acts so that in the low-speed state of the vehicle, a minute variation is removed from the detection signal of the stroke sensor 14, and the detection signal is inputted in a target fluid pressure calculating unit 207.

As a result, the target fluid pressure calculating unit 207 operates so as not to respond to a minute variation in the detection signals of the stroke sensor 14. The action and operation are the same in the other embodiments using the filtering processing unit 204. However, when the processing speed and the processing effect are considered, the dead zone processing unit 202 is considered to obtain a better result in the control by the target fluid pressure calculating unit 207 than the filtering processing unit 204.

Next, a high-speed traveling time of the vehicle will be described. About the detection signal of the stroke sensor 14, even a more minute variation is inputted in the target fluid pressure calculating unit 207 at a high-speed traveling time as compared with a low-speed traveling time. In other words, at the time of high-speed traveling, a detection signal is inputted in the target fluid pressure calculating unit 207 in the state in which even a more minute variation is reflected. As a result, responsiveness of control to the input signal becomes high.

In the above described low-speed traveling time and high-speed traveling time, description is made with the output of the stroke sensor 14 as a representative example, but when the position and the moving amount of the input rod 11 are used as the brake operation amount, they have the same physical characteristics as the output of the stroke sensor 14, and the same operational effect is obtained. Accordingly, in the specification of the present application, the output of the above described stroke sensor 14 is described as the concept including the position and the moving amount of the input rod 11.

The target fluid pressure calculating unit 207 calculates the target fluid pressure of the master cylinder 3, that is, the target braking force, and a motor control unit 208 controls the motor so that a braking force close to the target braking force can be obtained. In concrete, the target braking force can be calculated as the position of the assist piston 21. The actual position of the assist piston 21 is detected with the position sensor 33, and feedback control based on the detection value of the position sensor 33 is performed.

Further, whether the brake is abruptly applied or the brake is applied more smoothly depends on the generation torque of the motor 31, and feedback control is performed based on the motor current so that the generation torque of the motor 31 can be controlled along the target torque. By the output based on the above described feedback control of the aforementioned motor control unit 208, an AC current is supplied to the wiring of the stator 31b of the motor 31 from the assist control unit 6 of FIG. 1.

Instead of the processing of the aforementioned dead zone processing unit 202, the filtering processing unit 204 may be used, and the processing of filtering may be performed in the filtering processing unit 204. Next, one example of the filtering processing will be described. The filtering constant set by the filtering constant setting unit 203 is set as C. The constant C is a value in the following range.

$$1 > C > 0 \qquad (2)$$

More specifically, C is smaller than one and larger than 0 (zero).

The filtering processing unit 204 performs the following processing by using the filtering constant C set by the filtering constant setting unit 203. The output value Y0 resulted from the filtering processing is calculated by the following expression (3) by capturing the input value from the stroke sensor 14 which is one example of the operation amount of the brake pedal B at each set time, and setting the input value of the sensor which is newly captured as X0, and the past output value which is has undergone filtering processing as X1.

$$Y0 = X0 \times C + X1 \times (1-C) \qquad (3)$$

In the following filtering processing, the output value Y0 which has undergone filtering processing that is the calculation result of expression (3) is used as X1 in the calculation of the following expression (3). More specifically, the calculation result of expression (3) is used for the processing of the target fluid pressure calculating unit 207, and is used as the past output value X1 in the next filtering processing, as described above.

As the constant C is closer to the value "1" in the above described expression (3), the newly measured value is more significantly reflected. If the constant C becomes the value "1", the measured value is reflected as it is in the control of the target fluid pressure calculating unit 207. In this case, the filtering processing is not substantially performed.

In this embodiment, at the time of a high vehicle speed, the constant C is made close to "1", and at the time of a low vehicle speed, the value of C is set to be smaller. The setting of the constant C is performed by the filtering constant setting unit 203, and the filtering constant setting unit 203 stores the table corresponding to FIG. 3.

In the data of the table stored by the filtering constant setting unit 203, the axis of ordinates represents the constant C whereas the axis of abscissa represents the vehicle speed.

However, the difference from FIG. 3 is that while FIG. 3 shows the table with the vehicle speed becoming higher toward the right of the axis of abscissa, the graph which the filtering constant setting unit 203 has shows the table with the vehicle speed becoming lower toward the right of the axis of abscissa and the vehicle speed becoming zero at the right end of the axis of abscissa.

The vehicle brake system 1 has the structure in which the case 12 is fixed to the bulkhead 60 of the vehicle body, the input rod 11 is projected into the passenger compartment and the brake pedal B is connected to the input rod 11. Accordingly, when a rotational variation or a vibration occurs to the motor 31, it is likely to reverberate and be heard as an unusual noise in the passenger compartment. However, in the present embodiment, the dead zone amount is set to be a large value in the region with a low vehicle speed, and the rotational variation and vibration of the motor 31 are positively made small. Therefore, quietness in the passenger compartment can be kept in a low-speed traveling state and a traveling stopping state. Further, stability of control is enhanced.

In the present embodiment, as shown in FIG. 3, the characteristic of the dead zone amount is changed at the side where the detection signal of the stroke sensor 14 increases and at the side where it decreases, and at the increase side, the dead zone amount is changed to a large value by selecting a characteristic W1, whereas at the decrease side, the dead zone amount can be changed to a small value by selecting a characteristic W2. In this manner, by making the dead zone amount variable at the increase side and the decrease side, responsiveness at the side for increasing the braking force can be made high, and quietness can be enhanced in addition.

Further, by selecting the characteristic W1 in the control mode with the tendency to increase the braking force, and by selecting the characteristic W2 in the control mode with the tendency to decrease the braking force, responsiveness can be enhanced, and quietness can be enhanced in addition. A minute variation of the detection signal of the stroke sensor 14 is caused by a minute vibration of the brake pedal B by a user, a noise of the stroke sensor itself, a noise received from outside and the like.

If filtering is performed for the detection signal of the stroke sensor 14 by hardware, there is the fear of being incapable of obtaining desired responsiveness when high responsiveness is required at the time of hard braking or the like, for example. Therefore, it is preferable to perform filtering by software in the assist control unit 6. The aforementioned filtering processing by the software is performed for the operation amount of the brake pedal B, the depressed amount in this embodiment.

As described above, when the value of the detection signal of the stroke sensor 14 changes beyond the dead zone amount as a result of the processing of the dead zone processing unit 202 and the filtering processing unit 204, the target fluid pressure calculating unit 207 can perform update processing of the target control value, or can reflect the change of the detection signal in the control more significantly when the change of the detection signal exceeds a minute variation.

For example, when the change of the detection signal of the stroke sensor 14 is smaller than the dead zone amount, update processing of the target control value is not performed, and the target control value of the same value as the previous time is outputted. The target control value which is the output of the target fluid pressure calculating unit 207 is determined in accordance with the pedal stroke which is the detection signal of the stroke sensor 14 as shown in the graph of FIG. 4. The target control value calculated by the target fluid pressure calculating unit 207 is inputted in the motor control unit 208.

The target control value calculated in the target fluid pressure calculating unit 207 is sent to the motor control unit 208, and based on this value, the motor 31 is controlled. The rotor position of the motor is inputted in the assist control unit 6 from the position sensor 33, and the motor current value which is supplied to the motor 31 is inputted in the motor control unit 208 from the assist control unit 6, in addition to the target control value.

The value detected in the position sensor 33 and the target position of the motor which is calculated are feedback-controlled, and feedback control is performed so that the assist piston 21 is brought to the target position. In order to control whether the assist piston 21 is moved at a high speed or a low speed at this time, the motor control unit 208 performs feedback control for the motor current value while putting it in contrast with the actual motor current value, and thereby, enhances stability and reliability of control for torque and responsiveness.

The wheel speed signals of the respective wheels 100a to 100d which are detected by the wheel speed sensors 102a to 102d are inputted in the control device 7 for controlling the fluid pressure control unit 5, and are transmitted to the assist control unit 6 by the in-vehicle communication network (CAN). The assist control unit 6 changes the cutoff frequency of the pedal stroke amount in response to the received wheel speed signals as shown in, for example, FIG. 6, and thereby, can suppress vibrations due to the motor 31 at the time of a low vehicle speed while securing responsiveness at the time of high-speed traveling when responsiveness is especially required at the time of abrupt operation.

Figure 6:
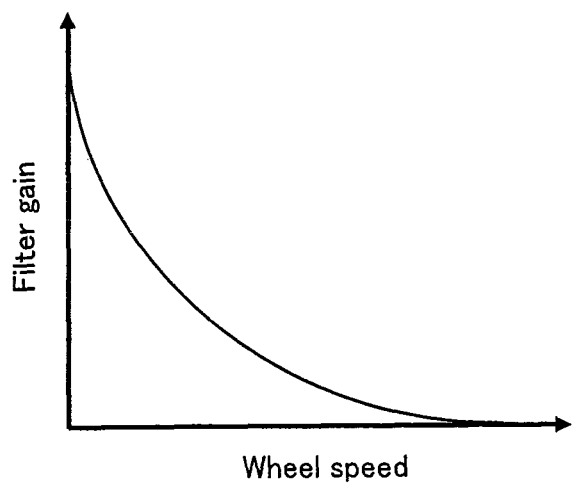
FIG. 6 is a graph showing the relationship of the wheel speed and a filter gain.

As shown in FIG. 6, responsiveness and reliability are enhanced by increasing the cutoff frequency as the wheel speed becomes higher, and decreasing the cutoff frequency as the wheel speed becomes lower.

Figure 7:
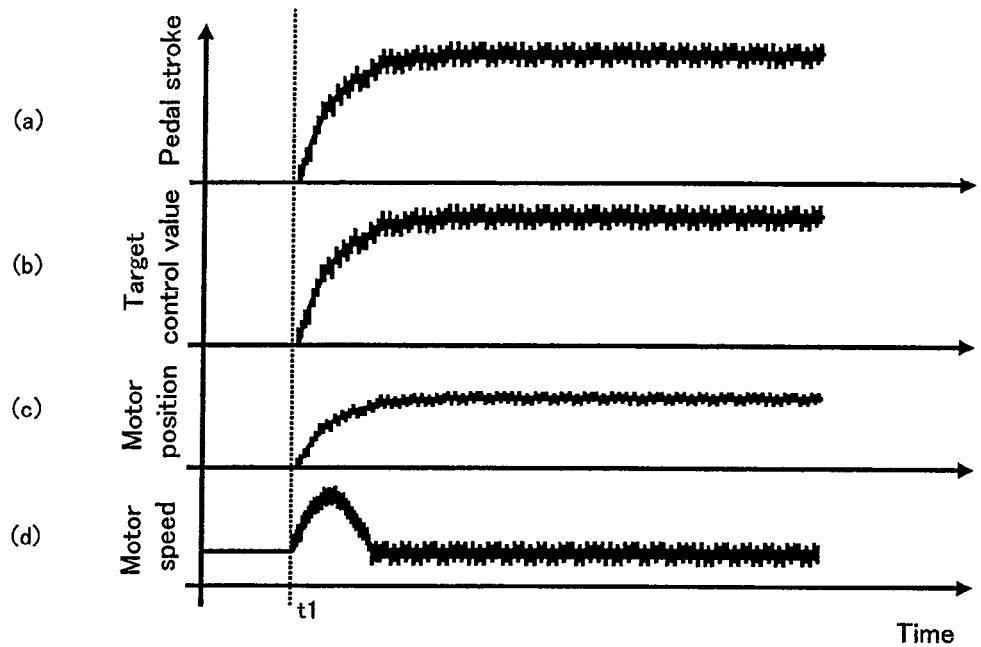
FIG. 7 is a time chart in the case where minute vibrations occur to a pedal stroke in a prior art.
Figure 8:
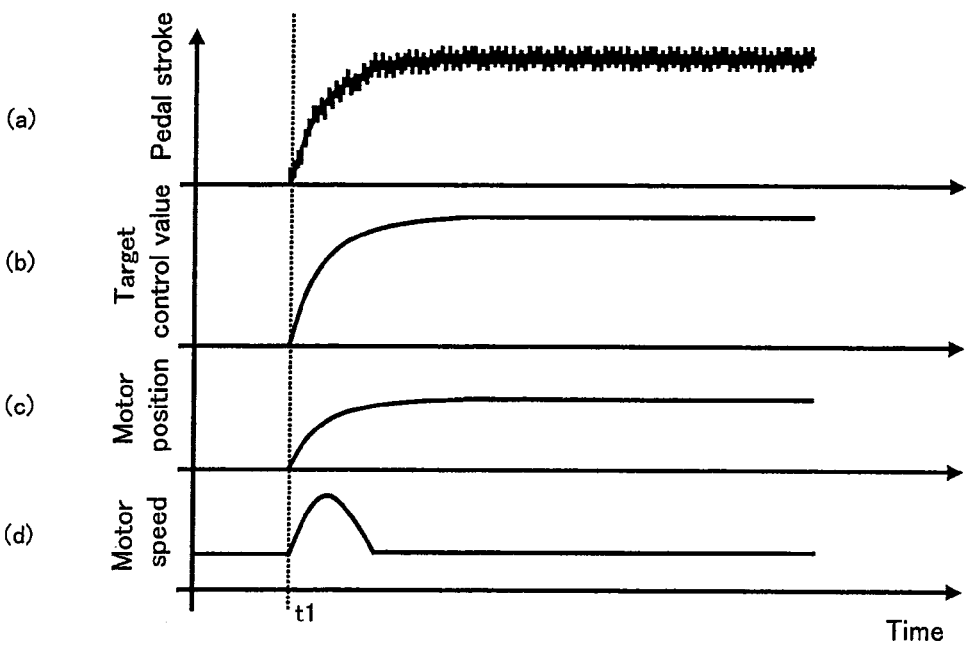
FIG. 8 is a time chart in the case where minute vibrations occur to the pedal stroke in the embodiment.

Next, by using FIGS. 7 and 8, the operation of the vehicle brake system 1 according to the embodiment will be described. FIG. 7 is a time chart showing the operation of a conventional vehicle brake system, and FIG. 8 is a time chart showing the operation of the vehicle brake system of the embodiment. Each of them shows the state in which the brake pedal B is depressed at a time t1 in the region with a low vehicle speed and the depressed state is held as it is.

In the conventional example, when minute variations occur to the detection signal of the stroke sensor 14 as shown in FIG. 7 (a), the target control value of FIG. 7 (b), the motor position of FIG. 7 (c), and the motor speed of FIG. 7 (d) vibrate in accordance with the minute variations. Accordingly, the main body of the motor 31 and the rotation-linear motion converting mechanism 32 vibrate, the bulkhead of the vehicle body member and the brake pedal B resonate, and there is the fear of an unusual noise reverberating and being heard in the passenger compartment.

In contrast with this, in the present invention, minute variations occur to the detection signal of the stroke sensor 14 as shown in FIG. 8(a), but by the aforementioned dead zone processing or the filtering processing, the vibrations are suppressed in the target control value, the motor position and the motor speed.

Accordingly, vibrations of the motor 31 main body and the rotation-linear motion converting mechanism 32 are prevented, and resonance of the bulkhead 60 to which the brake assist device 2 is mounted and the brake pedal B is suppressed, so that occurrence of an unusual noise can be prevented. Accordingly, for example, at the time of low-speed traveling and during stoppage of traveling, quietness in the passenger compartment can be secured, the environment in the passenger compartment is made favorable, and passenger comfort can be enhanced.

The present invention is not limited to the aforementioned embodiment, and various changes can be made within the range without deviating from the gist of the present invention. For example, when the vehicle to which the aforementioned vehicle brake system 1 is applied is an HEV vehicle, the dead zone amount or the filtering constant, or the filter frequency may be changed at the engine traveling time and the motor traveling time.

For example, at the time of engine traveling, even if a rotational variation and a vibration occur to the motor 31, the engine sound is larger than the unusual noise due to such vibrations or the like, and quietness in the passenger compartment is not influenced. Therefore, control is performed so as to make the dead zone amount or the filtering constant large, or to lower the filtering frequency, and responsiveness of the boosting operation by the motor 31 is enhanced.

Meanwhile, at the time of motor traveling, if an unusual noise occurs due to the vibration or the like of the motor 31, there is the fear that the quietness in the passenger compartment is influenced. Therefore, the dead zone amount is made large, or the filtering constant is made large, or the filter frequency is increased, whereby responsiveness of the boosting operation by the motor 31 is reduced. Thereby, a rotational variation and a vibration are prevented from occurring to the motor 31 in response to the minute variations of the detection signal of the stroke sensor, and quietness in the passenger compartment can be secured.

In the aforementioned configuration, the following problem can be solved, and the effect is exhibited, besides or in addition to the solution of the problem to be solved and the operational effect of the present invention.

Since the assist control unit 6 is fixed to the casing 12, the effect of being capable of making the entire system more compact is provided.

Further, the power line for supplying AC power to the stator 31*b* of the motor 31 from the assist control unit 6 can be made short, and radiation of a noise can be suppressed.

Further, the assist control unit 6 and the casing 12 can be made as an electrically connected configuration by forming them by a metal material and electrically connecting them to each other to be grounded to the vehicle body, and by providing the inverter circuit inside the assist control unit 6, the noise irradiated outside form the above described power line can be suppressed.

By disposing the reservoir 10 by using the space between the assist control unit 6 and the master cylinder 3, the entire system can be made compact. Especially because the motor is dispose at the passenger compartment side, the master cylinder 3 is disposed at the engine side, and the assist control unit 6 is disposed in the upward direction of the aforementioned casing 12, the space formed between the master cylinder 3 and the assist control unit 6 can be favorably used. When the reservoir 10 is disposed in the space, the reservoir 10 is in the upward direction, and the effect of easily removing air in the brake oil is provided. Further, the assist control unit 6 is disposed to be close to the wall 60, and therefore, the entire system can be prevented from being large.

By separately disposing the assist control unit 6 which controls the motor 31 and the control device 7 which controls the fluid pressure control unit 5, the assist control unit 6 can be fixed to the casing 12, and the control device 7 can be fixed to the fluid pressure control unit 5 though not disclosed in FIG. 1. This makes the brake system more compact. Further, productivity is enhanced.

What is claimed is:

1. A vehicle brake system, comprising:
an input piston that moves based on an operation of a brake pedal;
an assist piston that moves by an electric motor;
a master cylinder that generates a fluid pressure of a brake fluid based on both of said input piston and said assist piston;
a stroke sensor that detects an operation stroke of said brake pedal and provides a detection signal based on the operation stroke; and
a control unit that controls said electric motor;
wherein said control unit controls said electric motor based on the operation stroke of said brake pedal, and changes responsiveness of control of said electric motor to the operation stroke of said brake pedal based on a traveling state of a vehicle so that (a) responsiveness of the control of said electric motor at a lower wheel speed of said vehicle is lower than responsiveness of the control of said electric motor at a higher wheel speed of said vehicle above the lower wheel speed, and (b) responsiveness of the control of said electric motor when the detection signal of said stroke sensor increases is higher than responsiveness of the control of said electric motor when the detection signal of said stroke sensor decreases;
wherein said control unit has a dead zone processing unit that performs processing of responding to an input value when said input value corresponding to the operation stroke of said brake pedal changes beyond a predetermined dead zone amount, and a dead zone amount setting unit that sets the predetermined dead zone amount of the dead zone processing unit in accordance with the traveling state of said vehicle; and
wherein said dead zone amount setting unit sets said predetermined dead zone amount to be larger at the lower wheel speed of said vehicle than at the higher wheel speed of said vehicle.

2. The vehicle brake system according to claim 1, wherein said assist piston is in a hollow shape, said input piston is disposed inside said hollow shape of said assist piston, and both said input piston and said assist piston act as pistons with said master cylinder.

3. The vehicle brake system according to claim 1, wherein said control unit has a filtering processing unit that performs filtering processing of the input value based on a predetermined constant, and a filtering constant setting unit that sets the constant of the filtering processing unit in accordance with the traveling state of said vehicle.

4. The vehicle brake system according to claim 3, wherein said filtering processing unit captures said input value at set times, and outputs an output value Y0 calculated from the following calculation expression:

$$Y0 = X0 \times C + X1 \times (1-C)$$

Y0 is said output value, X0 is a newly captured input value, C is a filtering constant (0<C<1)), and X1 is a past output value.

5. The vehicle brake system according to claim 4, wherein said filtering constant setting unit makes a value of said filtering constant smaller at the lower wheel speed of said vehicle than at the higher wheel speed of said vehicle.

6. The vehicle brake system according to claim 3, wherein said assist piston is in a hollow shape, said input piston is disposed inside said hollow shape of said assist piston, and both said input piston and said assist piston act as pistons with said master cylinder.

* * * * *